US011057652B1

(12) United States Patent
Gauny et al.

(10) Patent No.: US 11,057,652 B1
(45) Date of Patent: Jul. 6, 2021

(54) ADJACENT CONTENT CLASSIFICATION AND TARGETING

(71) Applicant: Amazon Technologies, Inc., Reno, NV (US)

(72) Inventors: Ronnie Dean Gauny, Cedar Park, TX (US); Andrew Christopher Chud, Austin, TX (US); Scott Anthony Siegler, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 16/399,506

(22) Filed: Apr. 30, 2019

(51) Int. Cl.
*H04N 21/234* (2011.01)
*G06K 9/00* (2006.01)
*H04N 21/266* (2011.01)
*H04N 21/845* (2011.01)
*H04N 21/81* (2011.01)

(52) U.S. Cl.
CPC ... *H04N 21/23418* (2013.01); *G06K 9/00718* (2013.01); *H04N 21/266* (2013.01); *H04N 21/812* (2013.01); *H04N 21/8455* (2013.01)

(58) Field of Classification Search
None
See application file for complete search history.

(56) References Cited

U.S. PATENT DOCUMENTS

| | | | |
|---|---|---|---|
| 8,196,164 B1 * | 6/2012 | Oztaskent | ............ H04N 21/435 725/32 |
| 8,335,719 B1 | 12/2012 | Quraishi | |
| 8,386,509 B1 | 2/2013 | Schofield | |
| 8,655,727 B2 | 2/2014 | Scholl | |
| 8,799,401 B1 | 8/2014 | Bryar | |
| 8,849,945 B1 | 9/2014 | Desjardins | |
| 9,043,828 B1 * | 5/2015 | Jing | .................... H04N 21/2668 725/32 |
| 9,760,778 B1 | 9/2017 | Wakim | |
| 2006/0085408 A1 * | 4/2006 | Morsa | ................. G06Q 30/0275 |
| 2007/0250901 A1 * | 10/2007 | McIntire | ............ H04N 21/8586 725/146 |
| 2009/0123090 A1 * | 5/2009 | Li | .......................... G06Q 30/02 382/305 |
| 2010/0070996 A1 * | 3/2010 | Liao | ..................... H04N 21/812 725/35 |
| 2011/0052144 A1 * | 3/2011 | Abbas | ............... H04N 21/23418 386/240 |

(Continued)

OTHER PUBLICATIONS

U.S. Non-Final Office Action issued in U.S. Appl. No. 16/429,322 dated Apr. 30, 2020.

(Continued)

*Primary Examiner* — Fernando Alcon

(74) *Attorney, Agent, or Firm* — Hogan Lovells US LLP

(57) ABSTRACT

Video content is evaluated to classify one or more scenes or objects of the video content. The classifications may be evaluated against one or more rules for determining whether to include key words associated with the classifications for targeting supplemental content. Classifications that satisfy the one or more rules may be used for selection of supplemental associated with one or more key words Selected supplemental content may be included in video content in a break period following primary content.

20 Claims, 9 Drawing Sheets

(56) References Cited

U.S. PATENT DOCUMENTS

| | | | |
|---|---|---|---|
| 2011/0251896 A1* | 10/2011 | Impollonia | H04N 21/26603 |
| | | | 705/14.55 |
| 2013/0298159 A1* | 11/2013 | You | H04N 21/44213 |
| | | | 725/34 |
| 2014/0109123 A1 | 4/2014 | Balakrishnan | |
| 2014/0195890 A1 | 7/2014 | Taylor | |
| 2014/0310756 A1 | 10/2014 | Canney | |
| 2015/0149293 A1* | 5/2015 | Xiong | H04N 21/812 |
| | | | 705/14.64 |
| 2016/0044374 A1* | 2/2016 | Ren | H04N 21/6125 |
| | | | 725/34 |
| 2017/0091828 A1 | 3/2017 | Siegler | |
| 2017/0091829 A1 | 3/2017 | Siegler | |
| 2017/0295411 A1 | 10/2017 | Sandholm | |
| 2018/0020247 A1* | 1/2018 | Zhang | G06Q 30/0241 |
| 2018/0041786 A1* | 2/2018 | Kim | G06Q 30/0251 |
| 2018/0091850 A1 | 3/2018 | Sandholm | |
| 2018/0352280 A1* | 12/2018 | Lim | H04N 21/8456 |
| 2019/0362377 A1* | 11/2019 | Zavesky | G06Q 30/0273 |
| 2020/0213644 A1* | 7/2020 | Gupta | G06Q 30/0273 |
| 2020/0329265 A1* | 10/2020 | Weinraub | H04N 21/23424 |

OTHER PUBLICATIONS

U.S. Final Office Action issued in U.S. Appl. No. 16/429,322 dated Aug. 25, 2020.
U.S. Notice of Allowance issued in U.S. Appl. No. 16/429,322 dated Nov. 5, 2020.

* cited by examiner

ADJACENT CONTENT CLASSIFICATION AND TARGETING

BACKGROUND

As people are consuming an increased amount of video content, advertisements may be integrated into video content to reach wider audiences. Advertisers may provide supplemental content for viewing during the primary video content, and may want to target their ads based on the information from the primary video content. Often, primary video content may be classified by genre (e.g., historical, action, drama) or other broad categories, but individual scenes or objects within the video content may include different classifications and/or may be more specific than merely looking at genre or the like. Furthermore, timing of advertisements within the video content may be important, as providing an advertisement closely in time with an associated scene or object of the primary content may provide a stronger connection between the primary video content and the supplemental content. Better targeting of supplemental content may lead to improved conversion rates for advertisers, which could potentially lead to more spending on supplemental content.

BRIEF DESCRIPTION OF THE DRAWINGS

Various embodiments in accordance with the present disclosure will be described with reference to the drawings, in which.

DETAILED DESCRIPTION

Figure 1A:
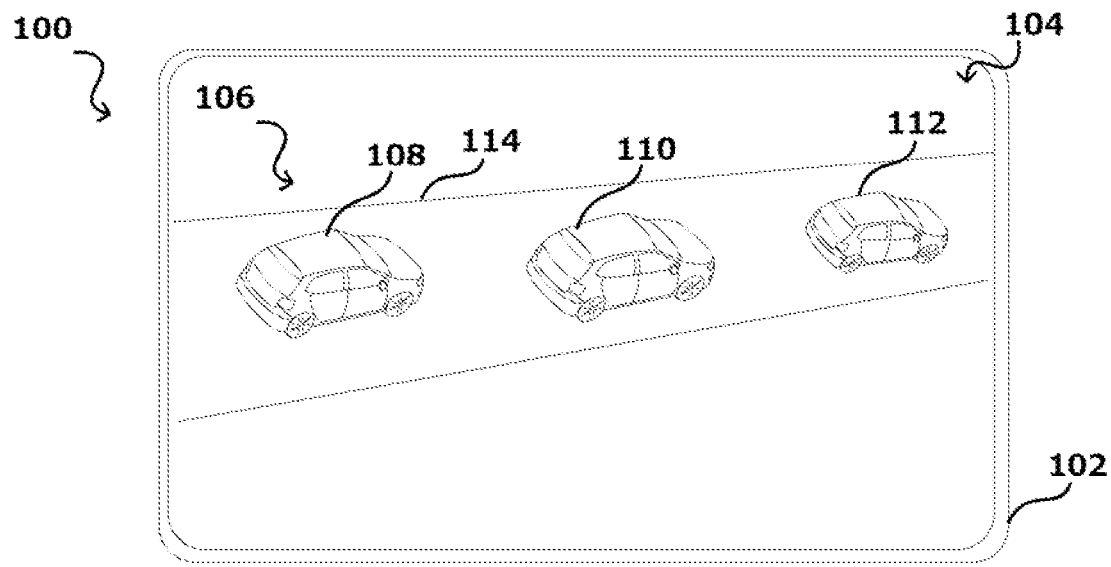
FIG. 1A illustrates an example environment in which aspects of the various embodiments can be utilized.

Systems and methods in accordance with various embodiments of the present disclosure overcome one or more of the above-referenced and other deficiencies in conventional approaches to content identification and/or classification and presentation of related content. In particular, various embodiments enable the identification and classification of content in media data (e.g., video, audio, text, etc.) displayed on interfaces (e.g., websites, applications such as mobile applications, console applications, wearable applications, etc.) using various image recognition, text recognition, speech recognition, and other such approaches. The identification and classification can be used to classify individual scenes and/or objects within the content, such that advertisements may be shown closely in time with related scenes and/or objects.

Embodiments of the present disclosure include analyzing content, such as video content, using one or more machine learning systems that may be utilized to classify particular scenes and/or images within the content. Identified content and/or features representative of the content can be received at an advertisement server that includes a content classifier module. The content classifier module can compare identified content and/or features representative of the content with one or more pieces of defined data (such one or more words or combination of words). Additionally, the content classifier module can compare features representative of the content to stored features to identify an object in the content. For example, the classifier may identify objects (e.g., cars, appliances, etc.), people (e.g., actors, characters, etc.), or scenes (e.g., car chases, dinners, dancing, etc.) along with a timestamp for when the classification occurs. In various embodiments, a first timestamp is noted when a certain activity or classification begins and a second timestamp is noted when the certain activity or classification ends, and as a result, a range or content segment is identified using the classifier. Additionally, in various embodiments, the first timestamp may be noticed when a certain object and/or item is identified and a third timestamp may be indicative of an expiration period that determines when the identified object and/or item is no longer deemed relevant for supplemental content (e.g., within a threshold limit). Throughout video content, various different content segments may be arranged as a combination of different scenes, such as a person driving to a restaurant and having dinner. In various embodiments, the segment may be classified, in a first scene, as driving, and in a second scene, as dinner. Additional information may be also present, such as identification of particular objects within the scene (e.g., brands, celebrities, items, etc.) which may further be utilized for classification. As a result, one or more scenes may include one or more classifications. These classifications may then be utilized, at least in part, with a threshold period of time to suggest and/or deploy upcoming supplemental content.

In various embodiments, advertisers may develop campaigns to present supplemental content (e.g., advertisements, secondary content) that may be shown during the primary content, such as during a scheduled ad break. This ad break may be arranged after one or more of the identified scenes. In certain embodiments, such as pre-recorded programming or stored programming, the ad breaks may be known. However, in certain embodiments, such as live broadcasts, the ad breaks may not be known before and may be deployed based on one or more factors, such as a trigger within the primary content, a request or demand from a content provider, or the like. It may be advantageous to position an advertisement directed toward a particular product or service close in time after a similar product or service is viewed in the primary content. For example, after a viewer watches a scene related to a car driving down the road, it may be advantageous to show advertisements directed to cars or car insurance. Similarly, a viewer watching a scene with a family eating dinner may be influenced by a subsequent advertisement for a food or beverage product. Accordingly, identification of various scenes and/or objects, via the classifier, may be useful in providing recommendations for where to place particular advertisements.

Furthermore, in various embodiments, associations between the scenes and/or objects within the content and the advertisements may be less intuitive, but effective nonetheless. For example, supplemental content associated with campaigns may include a list of key words or line items that are indicative of targets or related content. However, embodiments of the present disclosure may also recommend different key words for association with the supplemental content. In an example, a scene that illustrates a hot desert may be paired with supplemental content for a cool beverage. In this manner, different recommendations may be utilized based on the context of the scene and/or various identified objects to recommend different types of advertisements.

In various embodiments, content may be pre-analyzed, for example, with video on demand type services. Additionally, in various embodiments, content may be analyzed in real or near-real time (e.g., without significant delay). Generated time index classifications may be utilized to present supplemental content, such as during commercial breaks (e.g., pre-known, scheduled, or called upon by a content provider), by comparing the classifications for the content to associated line items provided for various campaigns. For example, the classifications may be evaluated against the line items to identify line items (e.g., keywords identified by advertisers) that are within a threshold amount of similarity to the classifications. As a result, the line items, and the associated supplemental content, may be selected as potential supplemental content during the break. In various embodiments, the identified line items may form a subset of supplemental content from the original list. Furthermore, the subset may be selected and/or determined based on identified scenes and/or objects, as will be described below.

Furthermore, in various embodiments, a timeliness quantity may be advantageous in presenting the supplemental content. For example, it may be useful to have the supplemental content play as closely in time to the scene and/or identified object having the associated classification as reasonably possible. As a result, a time period between the scene and/or object having the classification and the break may be analyzed. Furthermore, in embodiments such as live broadcasts, a time threshold or the like may be established after identification of supplemental content. If the time period exceeds a threshold, then various classifications and their associated line items may no longer be considered relevant, and may be removed from the subset. It should be appreciated that the time period may be particularly selected for a variety of different types of content or situations. Additionally, in various embodiments, a number of identified classifications between break periods may also be relevant, and in certain embodiments, more relevant than the time period. For example, a first classification may be within the time period (e.g., threshold), but several different classifications may be identified and shown prior to the break, and as a result, the first classification may be less relevant than the later classifications, which may have shorter period of time between it and the break. Accordingly, various factors may be utilized to identify relevant supplemental content for presentation. Various other functions and advantages are described and suggested below as may be provided in accordance with the various embodiments.

In various embodiments, classifications may occur in real or near-real time, for example during a live broadcast. As a result, the classifications may drive a changing and/or updating list of line items and associated content that may be shown during the break. For example, in a first scene a celebrity may be identified using facial recognition, and a threshold period of time may begin after the identification. If a break is within the threshold, supplemental content that has line items associated with the identified actor, such as an upcoming movie featuring the actor, may be selected for presentation during the break. Moreover, it should be appreciated that different portions may include multiple identified objects, which may provide different line items. By way of example, facial recognition may recognize an actor wearing a shirt from Brand A and drinking a beverage from Brand B. As a result, each of these identified items may be associated with a particular classification, which may provide different corresponding line items. In this manner, supplemental content associated to any of the classifications may be selected for deployment during an upcoming break.

FIG. 1A illustrates an example situation 100 wherein a computing device 102 is playing a first scene 104 of video content 106. Although a portable computing device (e.g., a smart phone, an electronic book reader, tablet computer, smart TV, etc.) is shown, it should be understood that various other types of electronic device that are capable of determining and processing input can be used in accordance with various embodiments discussed herein. These devices can include, for example, notebook computers, personal data assistants, video gaming consoles or controllers, portable media players, wearable computers (e.g., smart watches, smart glasses, etc.), and streaming media devices, among others.

In this example the device 102 can render video content for playback. The video content may be from a content provider, such as a streaming video service, or from a stored file. It should be appreciated that while the illustrated content 106 may be video content, the content can include text, images, audio data, etc. In accordance with an embodiment, video content 106 can include text, video, or audio or a combination thereof. As a user watches the video content 106, advertisements may appear. These advertisements may be provided in exchange for a lower cost or no-cost viewing arrangement for the viewer, however, it should be appreciated that the advertisements may also be presented as a condition of utilizing the service.

Figure 1B:
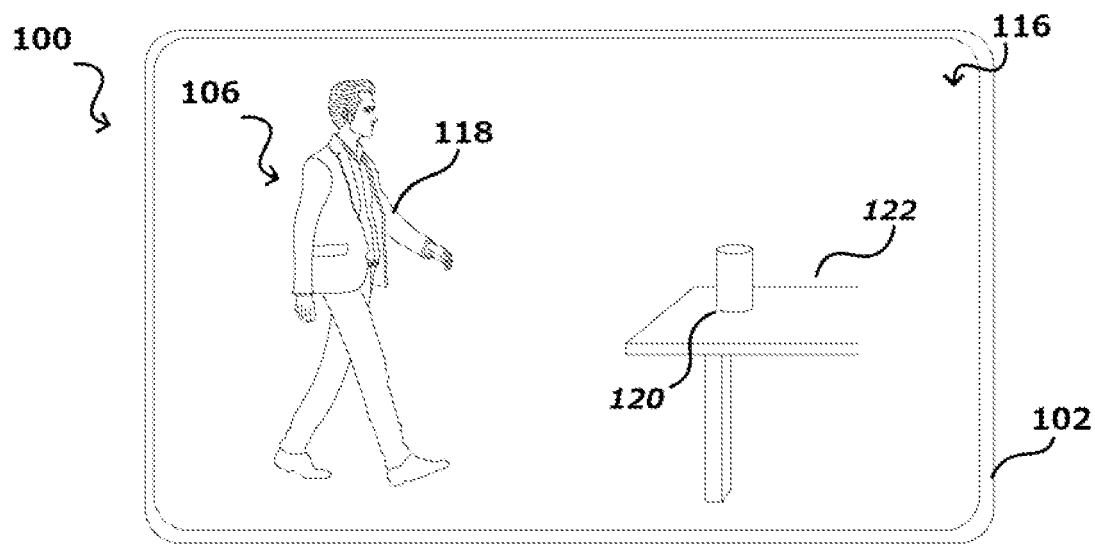
FIG. 1B illustrates an example environment in which aspects of the various embodiments can be utilized.

FIG. 1A illustrates the first scene 104 of content, which may extend for a period of time (e.g., a duration), that illustrates a first car 108, a second car 110, and a third car 112 driving along a road 114. The first scene 104 may be part of a larger sequence of content that combines several scenes in order to provide a program for a viewer. In various embodiments, different identifications and/or classifications may be generated for the items within the first scene 104 and/or for the scene 104 itself. For example, the first car 108 may be identified (e.g., car, sedan) and/or a feature of the first car 108 may be identified (e.g., brand, color, etc.). Over time, the first scene 104 ends, and the program continues to a second scene 116, as illustrated in FIG. 1B. The second scene 116 is different than the first scene 104, in the illustrated embodiment, by including a character 118 walking toward an item 120 (e.g., a canned beverage), positioned on a table 122. As will be described below, these scenes may be evaluated, in various embodiments, by a classifier to identify one or more items or themes associated with the themes for use with presenting supplemental content, such as advertisements, during breaks in the program. For example, in the embodiment illustrated in FIG. 1B, the character 118 may be identified and classified by one or more features, such as identifying the actor playing the character 118 and/or the brand of clothing worn by the character 118. Similarly, in embodiments, the item 120 may be identified, for example, by a brand associated with the item 120.

Figure 2:
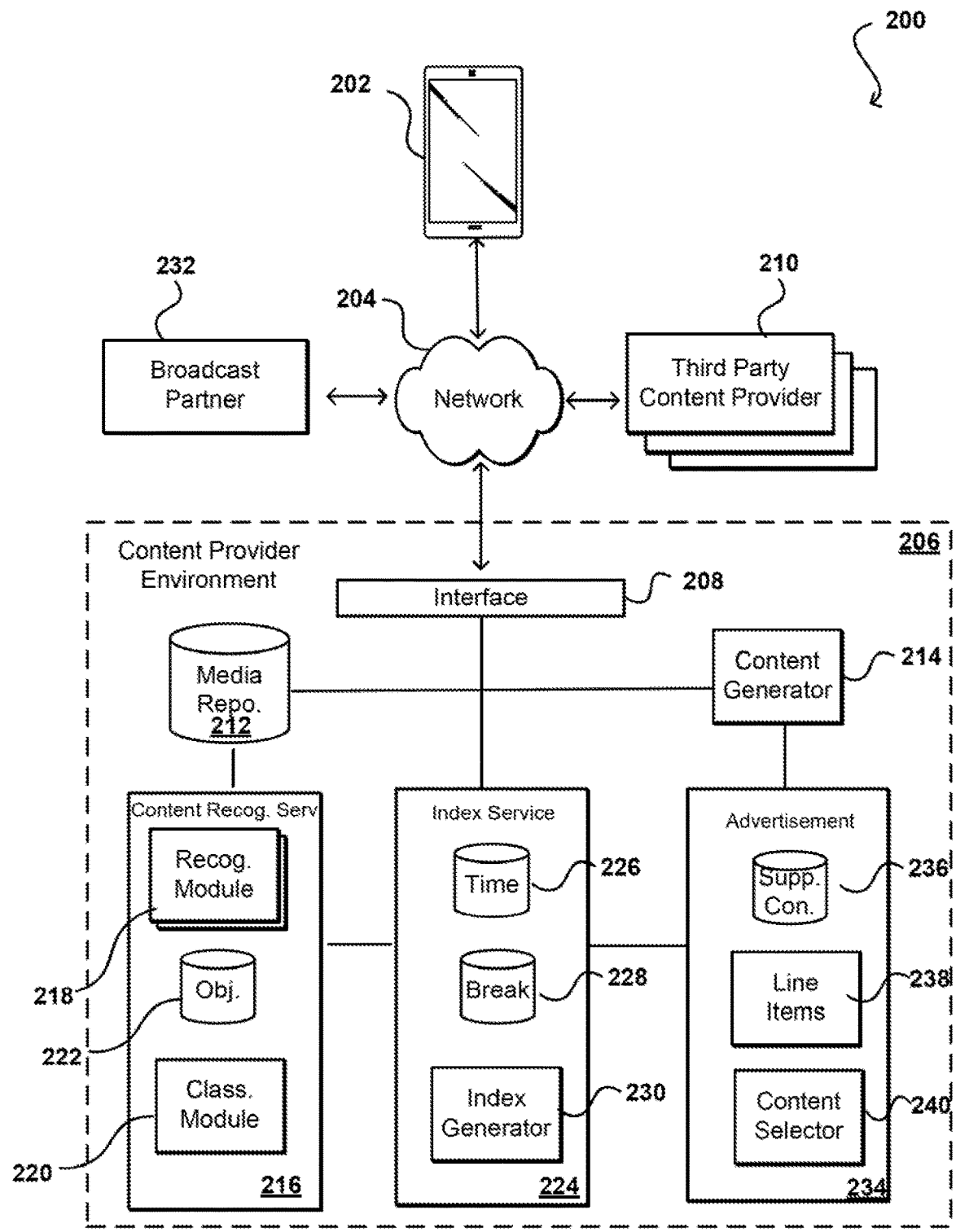
FIG. 2 illustrates an example system for identifying items and providing information about those items that can be utilized in accordance with various embodiments.

FIG. 2 illustrates an example content delivery system 200, in which aspects of the various embodiments can be implemented. In this example, a client computing device 202 can submit a request for content across at least one network 204 to be received by a content provider environment 206. This can include a request for specific content or a subscription to have content pushed to the client device 202, among other such options. In at least some embodiments the request can include a request for content to be displayed on, or presented via, the computing device 202, and in many cases will include video, audio, or other media content that is encoded for presentation by the client device 202. The network(s) can include any appropriate network, such as the internet, a local area network (LAN), a cellular network, an Ethernet, or other such wired and/or wireless network. The content provider environment 206 can include any appropriate resources for providing content from a resource provider, as may include various servers, data stores, and other such components known or used for providing content from across a network (or from the "cloud"). As mentioned elsewhere herein, the client computing device 202 can be any appropriate computing or processing device, as may include a desktop or notebook computer, smartphone, tablet, wearable computer (i.e., smart watch, glasses, or contacts), set top box, smart TV, or other such system or device. An interface layer 208, when receiving a request or call, can determine the type of call or request and cause information to be forwarded to the appropriate component or subsystem. These calls or requests can also come from third parties, such as streaming content providers who utilize the resources of the content provider environment 206, and third party providers 210 can provide at least some of the media content to be stored to a media repository 212. It should be appreciated that the media repository 212 may include both stored media and/or live media streams are that transmitted, for example from broadcasters, as will be described below. Accordingly, as described herein, embodiments of the present disclosure may be utilized with both stored media content, such as video on demand services, and also live streaming broadcasts.

In this example, a call or request received to the content provider environment 206 can be received by an interface layer 208 of the environment. As known for network environments, the interface layer can include components such as interfaces (e.g., APIs), load balancers, request and/or data routers, and the like. If the request is a request for content, such as for a video data stream to be provided to the client device 202, information for the request can be directed to the media repository 212 (which, as noted below, may include stored media content or live streaming broadcasts) or one or more content generators 214, which may evaluate the request and provide supplemental content for inclusion with the content.

As described above, in various embodiments the content may include one or more content items such as an image(s), audio, text, and/or video(s). In this example, the system includes a content recognition service 216. The content recognition service 216 can be implemented using software and/or hardware and can be configured to receive the content (or data representative of the content). The content recognition service 216 can include a recognition module 218, which may be utilized for object recognition, audio recognition, text recognition, or any combination thereof. The recognition module 218 can, for example, be and/or include an object recognition module that performs one or more image matching approaches as is used in computer vision, object recognition, motion tracking, three-dimensional (3D) modeling, and the like, which can be performed to identify relevant items such as products or other objects to enable classification of various components of the content. Example approaches include face and human detection (e.g., to detect specific actors or characters within the content), apparel recognition (e.g., to recognize specific brands or logos within the content), deep learning approaches, among other such approaches. As will be described below, various approaches may be utilized to identify objects and the like within content. These recognitions may be assigned when, for example, they are within a threshold confidence level.

In accordance with various embodiments, the content recognition service can receive, for example, video and/or other data. In this example, the content is video data. It should be noted that in some embodiments, an image can include a picture, a video frame that is a part of a video, and/or an animation frame that is a part of an animation. For example, one or more frames can be extracted or sampled from the video and/or animation to make up the one or more images. The video data can be segmented into one or more reference frames or keyframes. A reference frame can be, for example, an image that represents a summary of a portion of video data. In accordance with various embodiments, a video frame, for example, can be any basic sub-unit of a larger item or collection of digital media. For instance, a video data can be a sequence of still images, and each still image can be a frame. Similarly, a collection of images can be viewed conceptually as a sequence of still images, similar to that of video data. For such a sequence, or collection, each single image can be a frame. For streams, documents, or document collections consisting of audio, text, and/or other digital media, a frame can be a subset of the collection. Such types of media may be divided into sub-units of any length for analysis. In these examples, frames can include audio or text excerpts from longer streams. It should be noted that the use of frame herein is not intended to be limited to digital video or collections of digital images, and is used to refer to any sub-unit of any form of digital media.

A segment or shot can be a set of frames from a larger item or collection of digital media. For example, digital media, can be segmented into groups of frames according to various criteria to facilitate browsing and navigation. A segment may be any portion or subset of a larger item or collection of digital media. Alternatively, a segment could also be the entire item of digital media. For example, a segment may be a collection of digital images, or any portion of a digital video, regardless of its source or length (including the entire video). A keyframe or reference frame is a frame that is selected from a segment (set of frames) as a representative for that segment of digital media. A reference frame or keyframe can be a representative frame of the segment or shot.

Segmenting video can include, for example, using video analysis and related algorithms to identify 'shots.' A shot can be a contiguous sequence of frames that are largely similar, visually. Similar video is video that includes at least a minimum level features descriptors or other features that match at least a threshold amount. For example, if a video shows two people talking in a restaurant, there may be one camera on person A, and another on person B, and perhaps a third showing both in profile facing one another at the table. A shot would typically be a segment from one of those cameras, usually as that person is talking.

Shots can be identified by, for example, computing an overall similarity metric between individual frames of video based on the pixel values at each position, and then applying a threshold which, when crossed, indicates a new shot has been entered.

Once shots have been determined, they can be compared for overall similarity. In the example above, the shots from the camera on person A will generally be more similar to one another than any are to shots from the other two cameras. Shots from the three different cameras may then be assigned a label, a, b, or c, and there is a pairwise similarity metric between shots.

In accordance with various embodiments, the selection of a reference frame or keyframe from the segment or shot can be accomplished in a number of ways. At least some approaches can begin with the decomposition of the video into temporal segments (e.g., shots or scenes) and then extract a number of keyframes per temporal segment. For example, in accordance with an embodiment, the selection of the middle frame of each shot may can be designated the reference frame. In another example, low-level visual information of all video frames (or all shot frames or all scene frames) can be used to group frames using, e.g. k-means, and then frames can be selected as reference frames that are more similar to the groups centers of the groups. In another example, the video can be decomposed into segments based on inter-frame cosine similarity and the keyframes can be selected with k-means where k can be proportional to the length in time of the segment.

Once the keyframes are determined, the keyframes can be analyzed to identify content. For example, in some embodiments, the content recognition service can be configured to perform an object recognition process with respect to the video. For example, faces, products, music album covers, book covers, shapes, colors, and/or other objects included in an image can be recognized using the object recognition process. In one such example, face or head detection algorithms can be utilized to attempt to locate an approximate head or face portion in a keyframe. The head or face detection algorithm can include, for example, any appropriate algorithm known or used for such purposes, such as a template matching algorithm, a neural network algorithm, a Fisher linear discriminant algorithm, a maximal rejection classifier algorithm, a support vector machine algorithm, an edge filtering algorithm, an edge detection algorithm, and the like. In various embodiments, the face detection may further be utilized to recognize an actor or character within a scene, such as identifying a celebrity in a segment of primary content. Moreover, other embodiments may also utilize identification of brand logos, associated styles of clothing, particular colors associated with brands or sports teams, and the like.

In various embodiments, in order to detect other objects, at least some embodiments can utilize approaches or algorithms that utilize local features or other such representative points to represent a pattern. Accordingly, video data or other content can be analyzed to extract feature descriptors of features from the video data and visual words can be assigned, for example via a classification module 220. These features then can be used in a search vocabulary and a list of potential words created, that may be stored in an object data store 222. Each determined visual word can then be compared against groups of visual words stored in an index of visual words by a search engine in a manner similar to that employed by text retrieval techniques. As a result, a group of closest matching index images that at least partially match the local features can be determined based at least in part upon matching visual words. The matching index images can be used to provide advertisements and/or related content to user's device, as will be described below.

In various other embodiments, video content can be transformed into feature descriptors and compared to stored feature descriptors objects, such as those in the object data store 222. For example, in the situation where content includes video data, the system can extract features from each of the images using a feature extraction algorithm (e.g., Accumulated Signed Gradient) and transform the extracted features for each image into feature descriptors which can be compared against stored feature descriptions. In this way, typical image matching algorithms can take advantage of the fact that an image of an object, frame or scene contains a number of feature points (e.g., specific points in an image that are robust to changes in image rotation, scale, viewpoint or lighting conditions).

In various embodiments, the descriptor determination can include functionality to analyze a color palette, lighting, audio fingerprint, and other elements of the video while processing the videos. In this respect, the content recognition service can be based on groupings that are not solely object driven but rather based on groupings with a common color scheme, audio fingerprint, or other related aspects. The descriptors are compared against the correlated descriptors stored in descriptor database. Matching scores can be determined and returned for each of the comparisons. In this example, each of the matching scores represents a confidence for how well a one of the determined descriptors matches a stored descriptor. The comparison with the highest matching score is identified as a match and information associated with the match can be provided the advertisement server to determine one or more advertisements to display to the user on their computing device.

In certain embodiments, video content can be analyzed using a text recognition component, which may be part of the recognition module 218, to identify text such as logo, brands, etc. that can be utilized for classification of the scene. For example, the text recognition component of the recognition module 218 can be configured to perform an optical character recognition (OCR) process with respect to the content. For example, words or characters included in an image that are not yet machine-encoded can be converted into machine-encoded (i.e., machine-readable) text using the OCR process. Additionally, in various embodiments, the recognition module 218 may further include an audio recognition component to receive audio and attempt to recognize or identify one or more audio portions included in the audio content item. In one example, the audio recognition module can be configured to perform a speech recognition process, such as a speech-to-text process, in attempt to recognize/identify one or more words included in the audio content. Identified words can be utilized to determine context of the scene, which may facilitate classification of the scene.

According, information (e.g., feature descriptors, individual words, combinations of words, phrases, etc.) determined from the content recognition service 216 can be used to classify the content or source of the content in the video and/or other data. The information can be received at an index service 224 that may be utilized to generate a time index classification of the content. That is, while the content recognition service 216 may be used to classify individual scenes or frames, the index service 224 may generate time index classification of various different classifications at different times throughout the content. For example, information from the content recognition service 216, such as a classification of a particular frame or scene, may be received at the index service 224 and associated with a timestamp from a time data store 226. For example, the frame or scene from the content recognition service 216 may be associated with one or more timestamps, for example, a first timestamp indicating a start of a scene and a second timestamp indicating an end of a scene. Additionally, in various embodiments, the timestamp may indicate a time when a particular object is identified and classified within the scene. In various embodiments, the timestamp may also include a threshold or trailing time to prevent duplicative classifications. For example, in an embodiment where a scene includes content that flashes between two different objects (e.g., between two people speaking) a change between the classifications below a threshold may not be registered as different from the first classification. Furthermore, in embodiments, an identification of an object within a threshold period of time may replace an earlier identification. For example, in the scene described above, identification of a first person, a second person, and then the first person again, within a threshold, may replace the timestamp associated with a timestamp of the first identification of the person, as will be described in more detail below. Furthermore, in various embodiments, a scene as a whole may be classified. Such as a "car chase" or a "birthday party." Accordingly, the classification obtained from the content recognition service 216 may be applied to a scene over a period of time, rather than just a frame from the scene. In this manner, segments of the content may be classified based on both individual objects and their associated classifications or over a period of time to obtain context for a particular scene.

In various embodiments, the classification module 220 can attempt to classify or label the identified content and/or the source(s) of the content (e.g., images, audio, text, video) based at least in part on the word(s) or phrases identified in that content, and/or other distinguishing features. In some instances, a library or database can store a set of already defined data such as a set of defined words, phrases, feature descriptors, etc. The defined data can be already known, labeled, classified, preset, preconfigured, etc., to be associated with a particular classification or label. In some embodiments, the classifier can compare the identified content portion(s) against the defined data, in order to identify one or more pieces of defined data that substantially match (i.e., match within an allowable deviation) the identified content portion(s).

In various embodiments, the index service 224 also includes a break data store 228, which corresponds to time periods where breaks to the content, for example advertisement breaks, are stored. As described above, in various embodiments, content may include advertisements, which may offset the cost for users. The breaks in the content may be arranged at any time, for example, before viewing the content, after the content, or any time in between. In various embodiments, information from the time data store 226 and the break data store 228 are utilized by an index generator 224 to outline how content will be presented. For example, in embodiments where the content is stored video data, the content may be pre-analyzed such that different scenes will be classified along with pre-determined breaks for advertisements. The index generator 224 may identify the different classifications, and their relationship to the breaks, which may be utilized to present relevant content during the breaks. However, for real time or near-real time streaming, the index may be prepared by the index generator 224 as the content is presented. For example, various objects within the streaming video content may be identified as the content is presented. These objects may be classified and obtain an associated timestamp. Throughout the broadcast, in certain embodiments, various rules or definitions may be provided for breaks, which may be stored within the break data store 228. For example, in embodiments, breaks may be provided at regular intervals of the program. However, it should be appreciated that breaks may not be provided at even intervals. In other embodiments, triggers may lead to breaks. For example, during a soccer match, breaks may be included only during half time, as there are no other breaks presented during play. In other embodiments, breaks may be inserted on demand, for example, based on a command or request from a broadcast partner 232, which may also provide a source for content. For example, the broadcast partner 232 may transmit an instruction to the content provider environment 206, which may be associated with a streaming service or the like, instructing an upcoming break. In an example, during a broadcast of a football game, the broadcast partner 232 may request a break after a kickoff. The content provider environment 206 may receive the instruction and initiate the break after the kickoff and provide related content, for example, based on the classifications from the content recognition service 216. Thereafter, the index generator 224 may identify different classifications of scenes around the breaks to generate the index.

Information from the index service 224 and/or the content recognition service 216 may be transmitted to the advertisement service 234, which may be utilized to identify and select different supplemental content for inclusion during the breaks. It should be appreciated that, in various embodiments, the advertisement 234 may be a separate entity from the content provider environment 206, and that inclusion within the content provider environment 206 is for illustrative purposes only. The advertisement service 234 illustrated in FIG. 2 includes a supplemental content data store 236, which may include information regarding the ongoing campaigns provided by a plurality of different advertisers. The supplemental content data store 236 may include campaign duration, advertisers, creative, and the like. In various embodiments, information regarding the content may be utilized to limit or otherwise select particular advertisers and/or campaigns from the supplemental content data store 236. For example, certain advertisers may restrict or otherwise limit the types of content they wish to associate their products with, such as children's toys not being included with horror movies. Accordingly, in various embodiments, certain campaigns may be eliminated from contention without further analysis of the line items, thereby reducing processor usage.

In various embodiments, a line item module 238 is included to compare various line items, or keywords, to the classifications from the primary content. The line items from the line item module 238 may have associated supplemental content within the supplemental content data store 236. For example, classifications within the various scenes, for example individual objects that are identified, of the content may be compared to the line items to determine a match. It should be appreciated that an exact match may not be necessary, and rather, close matches may be acceptable for associating different campaigns with various scenes from the content. As a result, a subset of supplemental content, with matching or closely matching line items, may be identified for evaluation. Additionally, in various embodiments, associations may be identified by more than just close matches, such as contextual association. This is, as noted above, a scene illustrating hot weather may be accompanied by line items for ice cream or cold drinks. Or a scene illustrating an injury may be accompanied by line items for hospitals or medical supplies. It should be appreciated, in various embodiments, the comparison to the line item module 238 may change as primary content advances because different items may be identified and various previously-identified items may be deemed outside of a threshold associated with relevance.

A content selector 240 may receive information about potential supplemental content to deploy that may be associated with the classified scenes and/or objects. In various embodiments, deployment of the creative associated with the supplemental content may be a based on a quantity of time between the classified scene and/or object and the break. In other words, it may be advantageous to present the supplemental content as closely as possible to a related scene and/or object (e.g., a classified scene and/or object that is closely related to one or more line items). In various embodiments, the content selector 240 may evaluate a passage of time between the classified scene and/or object and the break. If the quantity of time is less than a threshold, then the supplemental content may be selected. If the quantity of time is greater than the threshold, different supplemental content may be selected.

It should be appreciated that the quantity of time may be particularly selected by the advertisers or the system. In various embodiments, the quantity of time may be an arbitrary or semi-arbitrary number (e.g., 2 minutes) while in other embodiments, the quantity of time may be a function of another time, such as a percentage of the total running time of the content or the running time between breaks. Additionally, the quantity of time may begin from a timestamp associated with when the object is first identified, a timestamp associated with when the object is no longer on the screen, and the like. As a result, different supplement content may be selected for particular portions of the content.

In various embodiments, additional factors, other than quantity of time, may also be utilized. For example, a number of classified scenes and/or objects may be determined, such as three different classified scenes and/or objects between a break. It may be desirable to limit the number of different scenes and/or objects before including supplemental content, as the first scene and/or object of the three scenes and/or objects in this example may not be on the user's mind once the third scene is complete or the third object is shown. Accordingly, in various embodiments, the number of scenes and/or objects, in additional to or in place of, the quantity of time between the classified scene and/or object and the break may also be utilized to select which supplemental content to deploy.

Figure 3A:
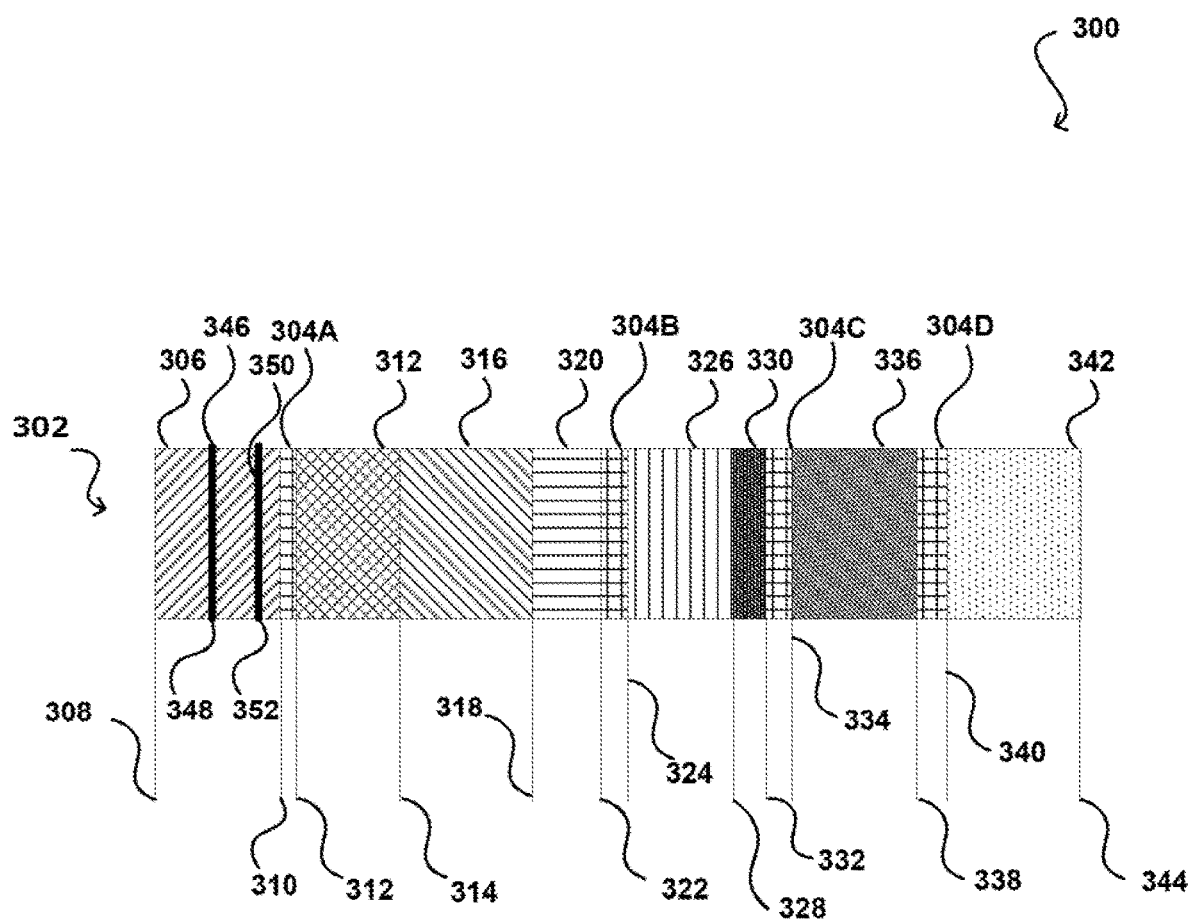
FIG. 3A illustrates an example content portion including classified scenes and breaks that can be utilized in accordance with various embodiments.

FIG. 3A illustrates an example 300 for identifying different scenes and/or objects within content 302 (e.g., video content) including breaks 304 (e.g., 304A, 304B, 304C, 304D). As described above, in various embodiments, the scenes may be classified using one or more machine learning techniques and may further be associated with respective start and end times to enable advertisers and the like to evaluate when to position various portions of supplemental content within the primary content. Furthermore, the objects or items within the scenes or the content in general may also be identified and associated with a timestamp indicative of when within the content the object or item appeared.

In the illustrated embodiment, a first scene 306 is classified having a start time 308 and an end time 310. The period of time between the start time 308 and the end time 310 may be referred to as a duration of the scene. As noted above, the first scene 306 may include one or more different words or phrases that correspond to the classification. That is, the first scene 306 may include multiple objects or events to provide categorization. For example, a person may be driving down the street in a "Company A" vehicle. As a result, the classifications for the scene may be "driving" "Company A" and "car," among other potential classifications. Accordingly, these classifications may be evaluated against line items, which may be obtained from various campaigns stored in a data store, to determine which piece of supplemental content to provide during the break 304A. In the illustrated embodiment, a start time for the break 304A corresponds to the end time 310 and also has a break end time 312. It should be appreciated that the start time for the break 304A may not be the same as the end time for a scene.

As described above, in various embodiments, supplemental content may be provided in the break 304A that corresponds to the first scene 306, which may be based at least in part on the classification of the first scene 306. In the illustrated embodiment, the first scene 306 is immediately adjacent to the break 304A, and as a result, an evaluation of a quantity of time between the first scene 306 and the break 304A would be approximately zero, which may be below a threshold, and as a result, supplemental content associated with the first scene 306 may be selected for inclusion within the break 304A. It should be appreciated that the breaks 304 described herein may be known, such as with stored video content, may be provided based on rules or instructions, such as with live streaming broadcasts, or may be directed based on input from a broadcast partner or content provider, for example with a live streaming broadcast. Accordingly, while the illustrated embodiment may include the full content 302 including various scenes, it should be appreciated that in other embodiments the subsequent scenes may be unknown until the live broadcast is received.

A second scene 312 has a start time that corresponds to the end time 310 for the break 304A and a second scene end time 314. Thereafter, a third scene 316 has a start time that corresponds to the second scene end time 16 and continues until a third scene end time 320. Subsequently, a fourth scene 320 starts at the third scene end time 320 and continues until a fourth scene end time 322, which is also a start time for the break 304B that has a duration until the break end time 324. The sum of the duration of the second scene 312, third scene 316, and fourth scene 320 may be referred to as a primary content portion of the content 302, which includes segments of the content 302 that may be classified, as opposed to the breaks 304. In the illustrated embodiment, the second scene 312, the third scene 316, and fourth scene 320 as illustrated as starting one after another, however, it should be appreciated that there may be other segments or portions, such as unclassified portions, between the scenes.

The second scene 312 may have a different classification than the third scene 316 and/or the fourth scene 320. Moreover, in various embodiments, there may be overlaps between the classifications of the second scene 312, the third scene 316, and/or the fourth scene 320. For example, the second scene 312 may correspond to a couple eating in a restaurant. As a result, the classification may be related to "date" and/or "eating" and/or "restaurant." The third scene 316 may be a close up of a man, who is part of the couple, holding a beverage from "Company B" and wearing a hat from "Team A." Accordingly, the classification for the third scene 316 may include "Company B" and/or "drinking" and/or "Team A" and/or "restaurant." The fourth scene 320, may be a close up of a woman, who is part of the couple, holding a beverage from "Company C" and wearing sunglasses from "Company D." The classification may be related to "Company C" and/or "Company D" and/or "sunglasses" and/or "restaurant." As demonstrated, in various embodiments, the different scenes may have different and/or related classifications, which may be utilized to determine supplemental content for the break 304B.

In various embodiments, a quantity of time (e.g., duration), such as a threshold, from the classification to the break 304B may be utilized to determine which supplemental content to include within the break 304B. For example, in the illustrated embodiment, the threshold may be less than the sum of the third scene 316 and the fourth scene 320. As a result, the classifications from the second scene 312 may not be used to select the supplemental content. Moreover, in embodiments, a number of scenes between a classification and the break may be utilized as a threshold. For example, a threshold of one scene between a classification and the break may be established. In the illustrated embodiment, there are three scenes (the second scene 312, the third scene 316, and the fourth scene 320) before the break 304B. As a result, classifications from the second scene 312 would not be utilized because there are two scenes (the third scene 316 and the fourth scene 320) between the classifications of the second scene 312 and the break 304B. Accordingly, the supplemental content may be preferentially selected to correspond to the classifications of the third scene 316 and the fourth scene 320.

In various embodiments, a fifth scene 326 begins after the break 304B having a start time corresponding to the break end time 324 and continuing until a fifth scene end time 328. The fifth scene 326 illustrated in FIG. 3 is followed by a sixth scene 330 with a start time corresponding to the fifth scene end time 328 and a sixth scene end time 332 that leads to a start of the break 304C. The illustrated break 304C has a break end time 334. It should be appreciated that, in various embodiments, the breaks 304 may have different durations, just as the content portions between breaks may also have different durations. As noted above, in various embodiments, classifications from the fifth scene 326 and/or the sixth scene 330 may be utilized to select supplemental content for inclusion within the break 304C. In various embodiments, certain thresholds or rules may be utilized to select the supplemental content, such as a duration of time between the classification and the break, a number of scenes between the classification and the break, a relatedness between the classification and the supplemental content, a price paid by the advertiser, or the like.

In various embodiments, a seventh scene 336 has a start time corresponding to the break end time 334 and a seventh scene end time 338 that leads into the break 304D, continuing until the break end time 340. Subsequently an eighth scene 342 has a start time corresponding to the break end time 334 and a duration that continues until the eighth scene end time 344. In the illustrated embodiment, there is only a single scene (the seventh scene 336) prior to the break 304D, and as a result, classifications from the seventh scene 336 may be utilized to select supplemental content for the break 304D without evaluating the time or number of scenes between the classification and the break 304D. However, it should be appreciated that other rules and the like may be implemented.

As described above, in various embodiments the content 302 may be parsed or otherwise segmented into a plurality of scenes and breaks, which may be further analyzed for presentation to the user. For example, the scenes may be identified by a duration (e.g., a period of time between start and stop times) and classified using one or more machine learning techniques, such as those described above. Breaks in the content may include a duration that is filled with supplemental content, that may be selected to relate to the classifications of the scenes leading up to the break. However, it should be appreciated that supplemental content may also be selected on a basis of subsequent scenes. For example, for video on demand content, an upcoming scene that will include a product from Company A may be identified and the break leading up to the scene may include supplemental content for Company A. In this manner, advertisements may be presented to users on the basis of relatedness to the content the user is viewing, as well as timeliness.

As described herein, in various embodiments the scenes may further include objects or items that may be separately identified and classified for use with deployment of supplemental content. For example, the first scene 306 may include a first identification 346 at a first identification time 348 and a second identification 350 at a second identification time 352. The first and second identifications 346, 350 may correspond to classifications within the content, which may be obtained via one or more object recognition modules, such as those descried above. The first and second identification times 348, 352 may further be utilized to determine which secondary content to present during breaks 304, such as the first break 304A. For example, if a duration from the first and/or second identification times 348, 342 are less than a threshold until the first break 304A, the first and second identifications 346, 350 may be used to determine which supplemental content to include during the break 304A.

Figure 3B:
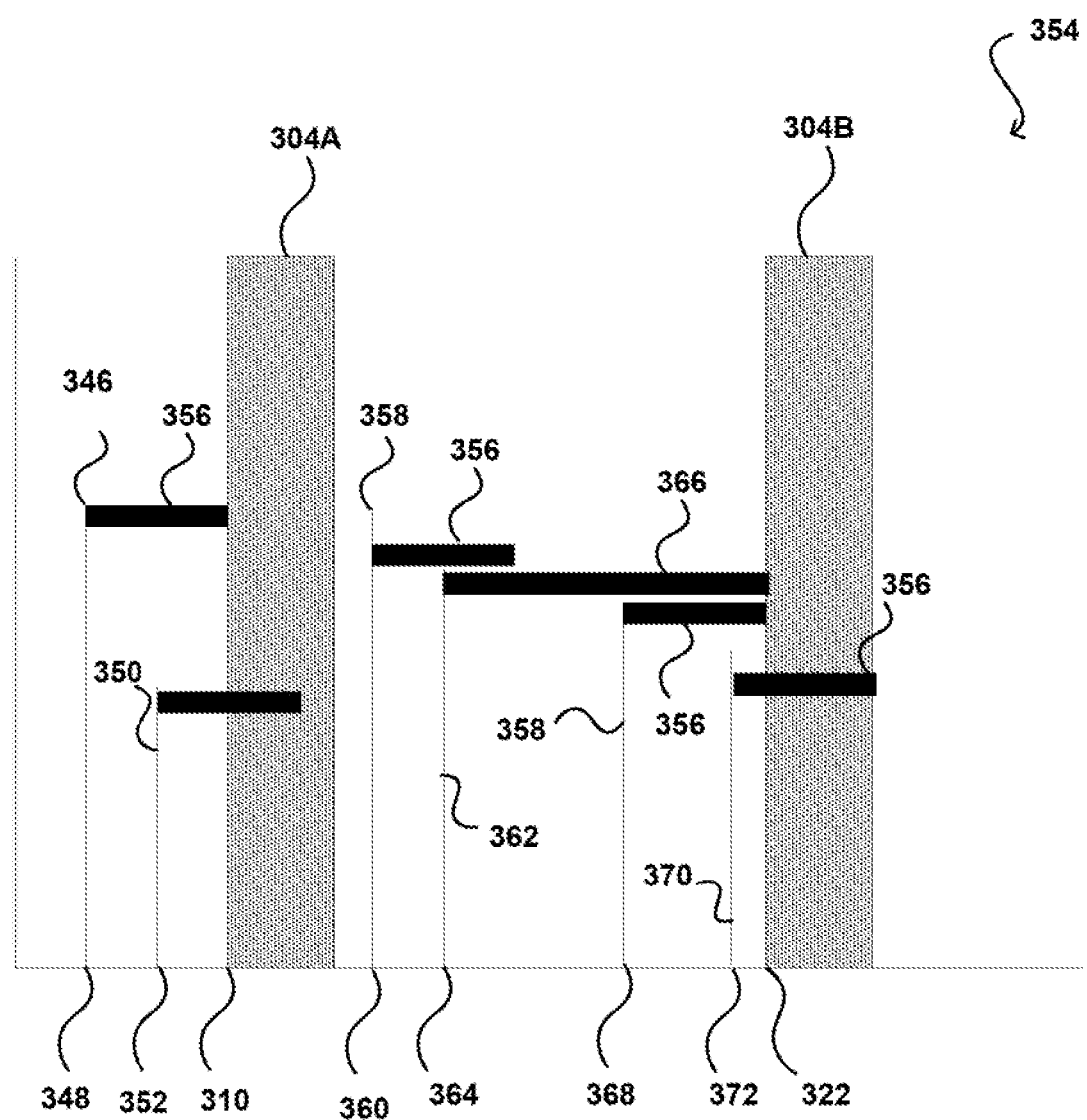
FIG. 3B illustrates an example environment for tracking periods of time between identified objects and breaks that can be utilized in accordance with various embodiments.

FIG. 3B illustrates an example timeline 354 illustrating a plurality of identifications at different times between breaks 304. As described above, while the first and second breaks 304A, 304B are illustrated in FIG. 3B, it should be appreciated that the break times are not known in advance, such as during a live streaming broadcast. As a result, a call for the breaks 304 may be provided from a variety of sources, such as predetermined rules, a broadcast partner, a content provider, and the like. In the illustrated embodiment, the first identification 346 is classified at the first identification time 348 and the second identification 350 is classified at the second identification time 352. Each of the first and second identification times 348, 352 may be recorded, and thereafter, a threshold time period 356 (represented by the bar) may be added after the respective first and second identification times 348, 352. The threshold time period 356, as noted above, may be determined by the advertiser or content provider for providing relevant secondary content after identification during primary content. In various embodiments, if a break 304, such as the first break 304A, starts prior to the expiration of the threshold time period 356, then the classification associated with the respective identification may be utilized for selection of supplemental content. If not, then different line items may be utilized.

In the embodiment illustrated in FIG. 1, the threshold time period 356 from the first identification 346 extends to the break start 310 (referred to as the end time 310 above). In order words, a period of time between the first identification time 348 and the break start 310 is less than a threshold amount of time. Accordingly, the classification associated with the first identification 346 may be utilized for selection of supplemental content. Similarly, the threshold time period 356 from the second identification 350 also extends to the break start 310. As a result, the classification associated with the second identification 350 may also be utilized for selection of supplemental content. In this manner, various embodiments may apply a threshold time period of identification for a break period to begin to determine whether classifications associated with the identification content may be utilized to select supplemental content.

The illustrated embodiment further includes a third identification 358 at a third identification time 360. In the illustrated embodiment, the threshold period of time 356 ends prior to the second break start 322 (which is referred to as the fourth scene end time above). Accordingly, the classification associated with the third identification 358 may not be used when selecting supplemental content for the second break 304B. A fourth identification 362 is illustrated at a fourth time 364. In the illustrated embodiment, a second threshold period of time 366 is associated with the fourth identification 362. As described above, various rules may be applied to different classifications. In this example, different threshold periods of time may be utilized for different classifications. In the illustrated embodiment, the second threshold period of time 366 does not end prior to the second break start 322.

The embodiment illustrated in FIG. 3B further includes a second instance of the third identification 358 at a fourth time 368. In the illustrated embodiment, the threshold period of time 356 does not end prior to the second break start 322, and as a result, classifications associated with the third identification 358 may be utilized with selection of supplemental content during the second break 304B. As noted above, for example during a live video stream, classifications may continuously change or be updated based on a passage of time and different classifications from the scene. Accordingly, while the third identification 358 and associated classifications may not have been used due to failure of the threshold at a certain time, later classifications may not exceed the threshold.

In various embodiments, a fourth identification 370 at a fifth time 372. As illustrated, the threshold period of time 356 does not end prior to the second break start 322, and as a result, the classifications associated with the fourth identification 370 may be used for select supplemental content during the second break 304B. As noted above, various additional rules may also be incorporated to determine which content to select, such as which classifications are the closest association with key words, how many classifications are provided between previous classifications, and the like.

Figure 4:
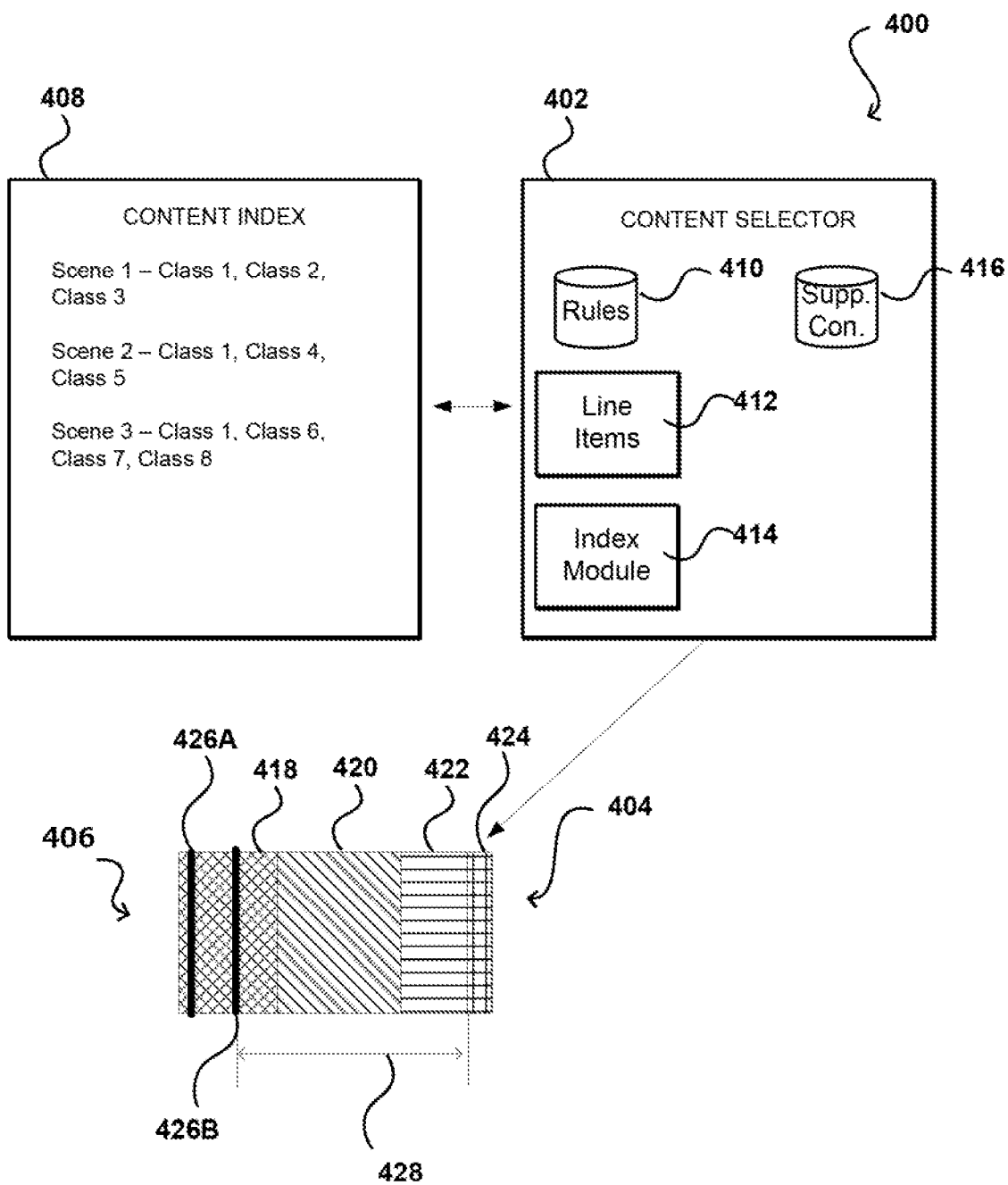
FIG. 4 illustrates an example system for recommending supplemental content that can be utilized in accordance with various embodiments.

FIG. 4 illustrates an example environment 400 of a content selector 402 for selecting supplemental content 404 for inclusion with primary content 406. In the illustrated embodiment, a content index 408 includes an index of various scenes from the primary content, including a duration of each index and associated classifications. As described above, the content index 408 may be generated prior to content selection (e.g., stored content) or as primary content is provided (e.g., live streaming). The content index 408 may be utilized by the content selector 402 in order to determine which supplemental content to insert into the primary content 406, for example during one or more breaks. In various embodiments, classifications of various objects and/or scenes of the primary content may be used to identify key words or line items associated with various pieces of supplemental content.

In various embodiments, the content selector 402 may be similar to the content selector describe with respect to FIG. 2. However, the respective content selectors 402 may include more or fewer features, and as a result, the illustrated embodiment shown in FIG. 4 is not intended to limit which modules or data stores may be associated with the content selector 402. In various embodiments, the content selector 402 includes a rules data store 410, which may include one or more rules or guidelines for evaluating and selecting supplemental content for inclusion with the primary content. For example, the rules data store 410 may include parameters for durations of time between classifications and a break where supplemental content may be included. The parameters may include thresholds or the like to evaluate whether or not a break is within a threshold amount of time after a classification, for example. Additionally, a number of scenes between a first scene and a break may also be evaluated, as described above. Moreover, a number of classifications between a first classification and a break may also be evaluated. Furthermore, in various embodiments, the rule data store 410 may also include priority or weighting factors that may be applied to select between supplemental content that is seemingly similar or relevant to one or more classifications. For example, the priority or weight may be applied to supplemental content that has paid a premium fee for inclusion, that is associated with a broadcast partner, or the like.

The illustrated content selector 402 further includes a line item module 412, which may include a list of line items extracted from a data store of potential campaigns, which include supplemental content that may be utilized during the breaks. In various embodiments, the line item module 412 includes line items from the campaign (which may be provided by the advertisers) and also synonyms or similar line items that may be provided by the advertising provider. Furthermore, in embodiments, a provider may suggest recommended line items, for example, based on contextual associations and the like. In an example, primary content may be evaluated and a certain product or brand may be identified within the primary content. As a result, line items for that product or company may be recommended to be associated with the primary content. In various embodiments, the index module 414 is utilized to evaluate the content index 408, for example, to determine the start and stop times for the associated scenes in the primary content 406. Also, in various embodiments, the index module 414 is used to evaluate a timestamp associated with certification identified objects and their respective classifications. Moreover, the index module 414 may be utilized to compare the respective classifications for the scenes and/or objects against the line items 412 to evaluate and determine which supplemental content to include with the primary content. For example, the index module 414 may evaluate the index, identify relevant ads based on the line items 412, and apply the rules from the rules data base 410 in order to determine which supplemental content from the supplemental content data store 416 to include with the primary content.

In various embodiments, primary content 406 may be separated into scenes, such as a first scene 418, a second scene 420, and a third scene 422. Each of the scenes 418, 420, 422 includes a start and stop time. In certain embodiments, a start time for one of the scenes may be the same as a stop time for another one of the scenes. As a result, a duration of each scene 418, 420, 422 may be determined. Supplemental content may be included within breaks 424, such as commercial breaks, that appear before or after scenes of primary content. Moreover, each scene 418, 420, 422 may include identifications 426, which may have their own associated classifications. In the illustrated embodiment, the first, second, and third scenes 418, 420, 422 all appear before the break 424. Thereafter, as described above, the classifications of the scenes 418, 420, 422 and/or the identifications 426A, 426B may be evaluated against the line items 412 to identify relevant advertisements from a database of campaigns. In various embodiments, rules may be applied to the evaluation, such as a duration of time between a classification and the break. For example, as described above, if a duration of time 428 is less than a threshold duration of time, then supplemental content related to the identification 426B of the first scene 418 may be included b. However, as noted above, various rules or weights may also be applied to otherwise promote or recommend supplemental content. In this manner, the supplemental content may be identified, based on classifications of the preceding or following scenes, and installed within the break 424 for viewing with the primary content 406.

Figure 5:
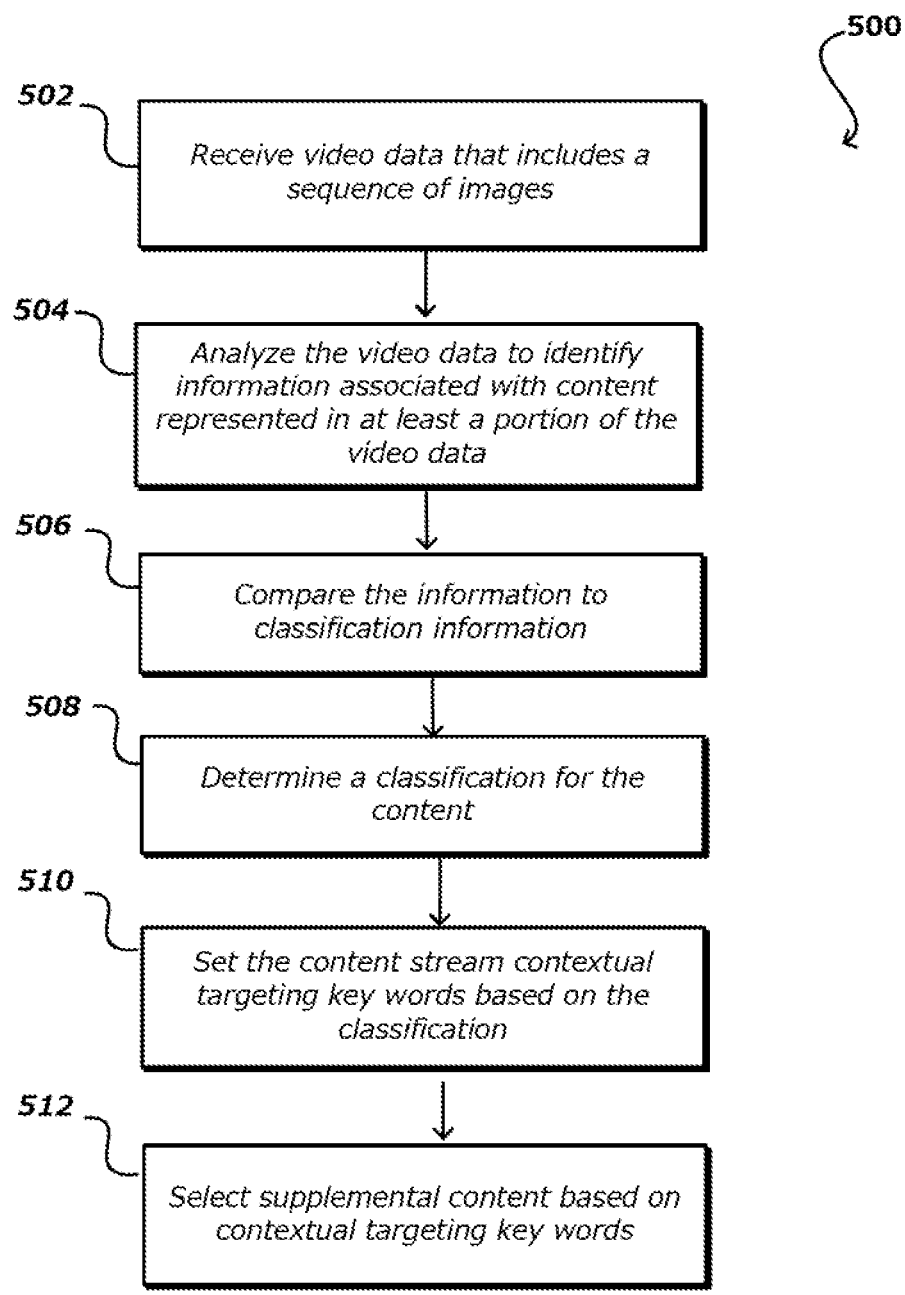
FIG. 5 illustrates an example processes for content classification and time indexing that can be utilized in accordance with various embodiments.

FIG. 5 illustrates an example method embodiment 500 for content classification based on data recognition. It should be understood that there can be additional, fewer, or alternative steps performed in similar or alternative orders, or in parallel, within the scope of the various embodiments unless otherwise stated. Video data and/or other data or content that includes a sequence of images can be received 502. In some embodiments, the content item can include at least one of video, an image, an audio, or text. In some embodiments, an image can include a still frame that is part of a video. In some embodiments, audio can include sound extracted from a video.

The example method can analyze 504 the video content to identify information associated with content represented in the video content, for example from a frame or segment of the video content, using at least one of an image recognition process, an audio recognition process, or a text recognition process. This can include determining identification information representative of content included in the video content (or at least a segment of the video content). Identification information can include, for example, feature points, feature descriptors, a model that incorporates a combination of identification information, etc.

In an example, analyzing the video content can include, determining an object represented in at least a portion of the video content, comparing the object to a plurality of stored objects to determine a match between the object and one of the stored objects, the stored object being associated with a word; associating the word with the object, and classifying the segment of the video content including the object with the word.

The information can be compared 506 to classification information to assign a classification to at least a portion of the video content, as described above. For example, the classification may be related to an object within the video content or a word or phrase uttered during the video content. Thereafter, classification for the video content, or at least a segment of the video content, can be determined 508. For example, if various different classifications are identified over a period of time, the various objects may be analyzed or evaluated to determine how alike they are to one another. In an example, a scene with a driver navigating a car through a city may include classifications such as "car" and "driving" and "pursuit," but may also include secondary classifications such as "hands" for the driver's control of the steering wheel or "tree" if the driver goes past a park. These features may be less important to the scene itself than the classifications of the car, and as a result, may not be assigned to the scene. For example, in various embodiments a threshold or confidence level may be utilized to determine which words or classifications to apply to the object.

In various embodiments, the content stream may have associated supplemental content that may be provided during advertising breaks. The supplemental content may be retrieved from an ad server or the like. In various embodiments, as described above, the supplemental content may be associated with one or more line items (e.g., key words) for targeting of the content. Accordingly, in various embodiments, content stream contextual targeting key words may be set 510, based at least in part on the classifications from the object recognition performed on the content stream. For example, in embodiments, the content stream may be of a live football game. Content recognition performed on the live football game may identify an injury on the field and a subsequent break may have targeting key words that are associated with the identification and classification of that injury, such as "bandages" or "pain killers" or "hospitals."

Accordingly, supplemental content for inclusion within the advertising break may be selected 512, based at least in part on the contextual targeting key words. Continuing the example above, subsequent supplemental content may include an advertisement for a pain reliever or for a local hospital.

Figure 6:
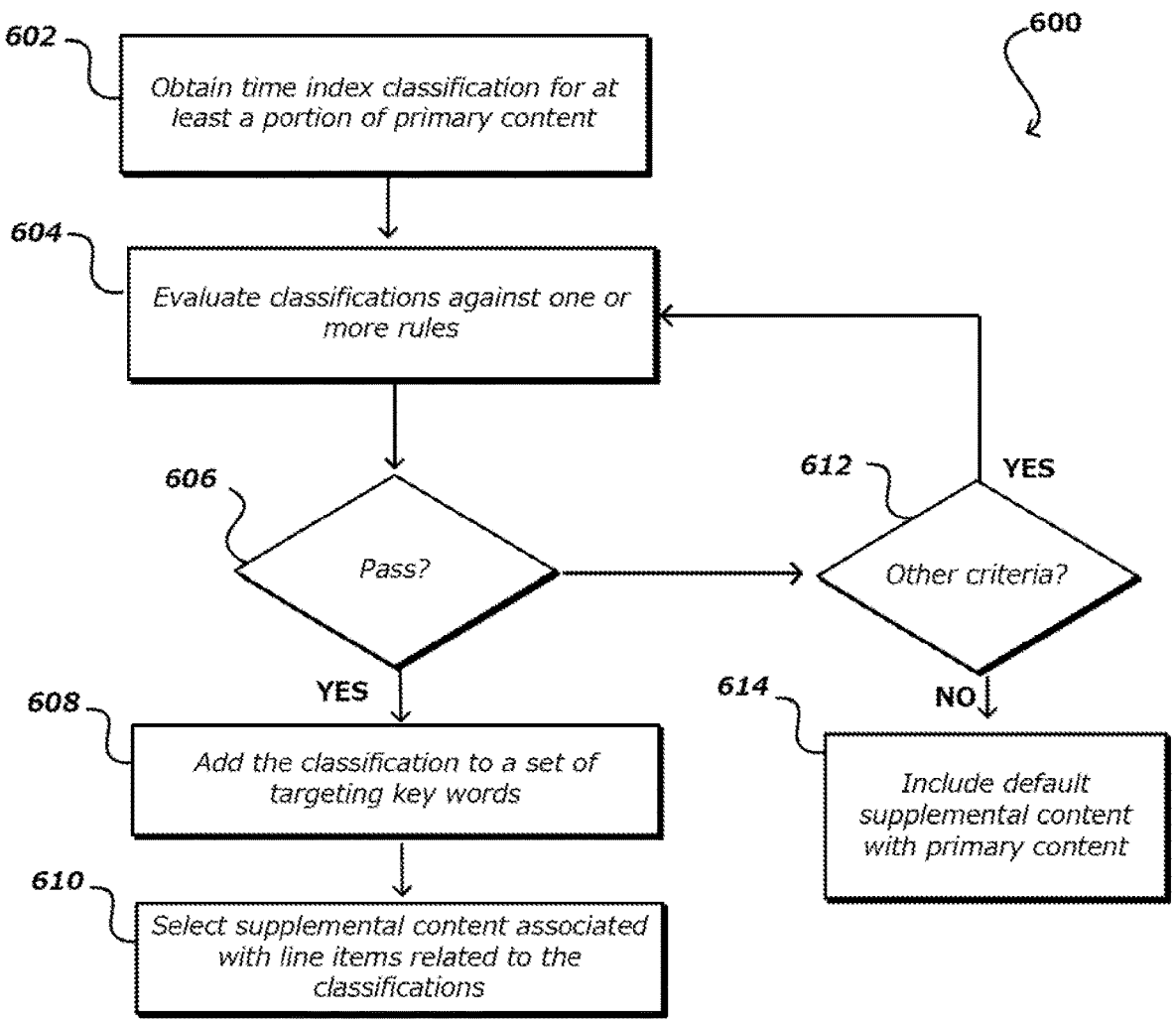
FIG. 6 illustrates an example process for supplemental content recommendation that can be utilized in accordance with various embodiments.

FIG. 6 illustrates an example method embodiment 600 for selecting supplemental content for inclusion with primary content based on a classification of at least a portion of the primary content. In this example, a time index classification is obtained 602 that relates to at least a portion of video content. As noted above, it should be appreciated that while embodiments may be described with respect to video content, that other embodiments may include text data, audio data, or combinations of text, audio, and video. The time index classification may include information related to classifications of context portions over periods of time within the video content. In other words, the time index classification may identify different scenes within video content, identify start and stop times for those scenes, and include classifications of object and the like within those scenes. In various embodiments where individual classifications for objects are included, a timestamp associated with the identification of the object may be recorded. However, various other features may be assigned or determined with respect to the classifications. In various embodiment, these may be referred to as a usage criterion, which may include a threshold between a start of the classification a start of a break period, a number of classifications between a first classification and a break period, or the like.

The method continues by evaluating the classifications against one or more rules 604. The rules may include thresholds corresponding to time, closeness, priority, and the like. For example, as described above, the time data for the classifications may be evaluated against corresponding time data for when the supplemental content will be viewed, such as when a call to include an advertising break comes. If a threshold period of time is exceeded, the supplemental content may be rejected, as the associated content will be provided too far into the future from the initial classification. Additionally, in embodiments, a number of classifications between the associated classification and the time when the supplemental content will be viewed may be evaluated. If there are too many different classifications between the initial classification and the supplemental content (e.g., more than a threshold), then different content may be selected.

In embodiments, if the classification passes the rule, the classification may be included as a set of key words utilized to select supplemental content 608. For example, the classification and other associated words may be included in a set of words to compare against line items (e.g., key words) that are associated with supplemental content. Supplemental content can then be selected, for inclusion with the primary content, based on the key words 610. Furthermore, it should be appreciated that several entries of supplemental content may be associated with the key words based off of the classification. As a result, other rules or ranking factors may be presented, such as payment received, association with the broadcaster partner, and the like.

In certain embodiments, the classifications may not pass the rules. For example, a period of time between the classification and the next break may exceed a threshold. If the classification does not pass, other criteria are evaluated 612. For example, in various embodiments, other criteria may include weighting factors or various other features that may influence which supplemental content to include. If additional criteria apply, it may be applied and then may be evaluated against the rules, as described above. If there are no additional criteria, default supplemental content, for example in line with an existing campaign, may be provided 618. In this manner, associated content can be identified and evaluated for inclusion with primary content.

Figure 7:
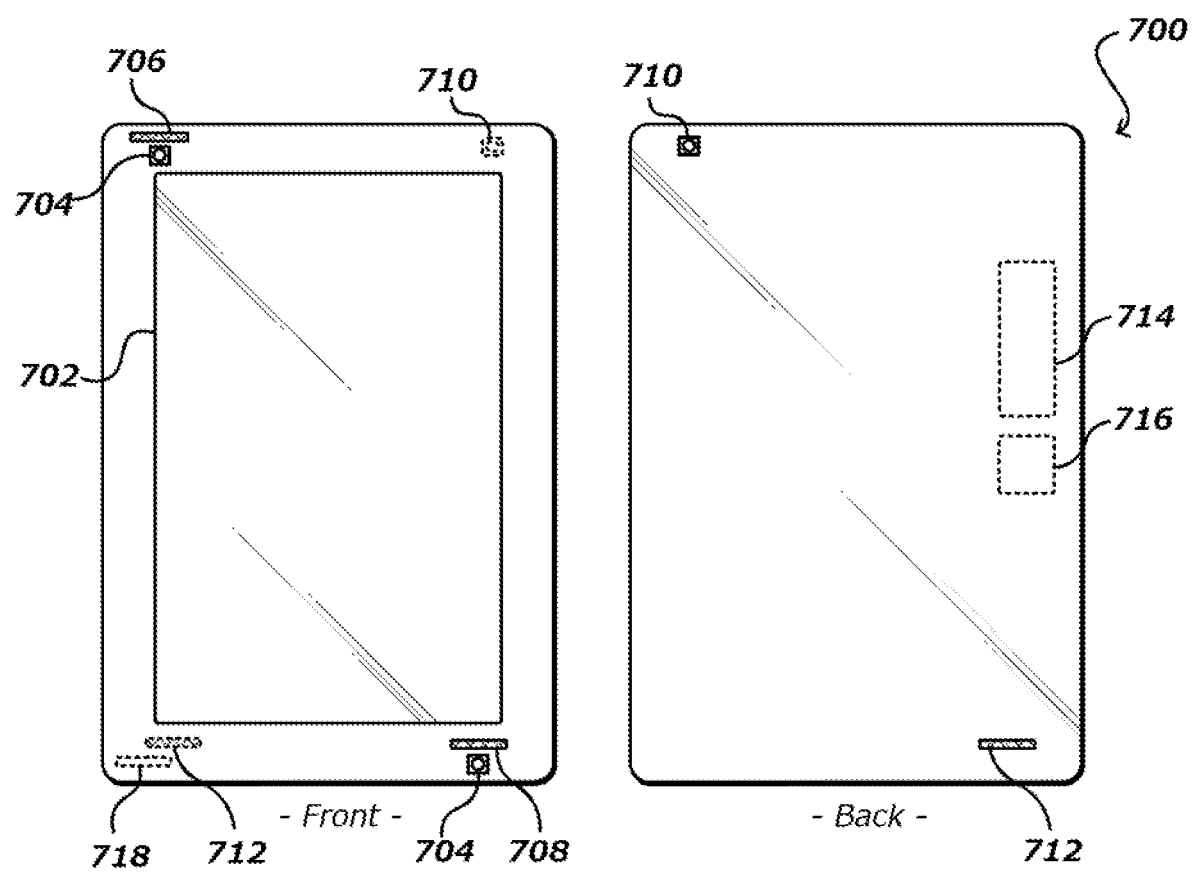
FIG. 7 illustrates an example device that can be used to implement aspects of the various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
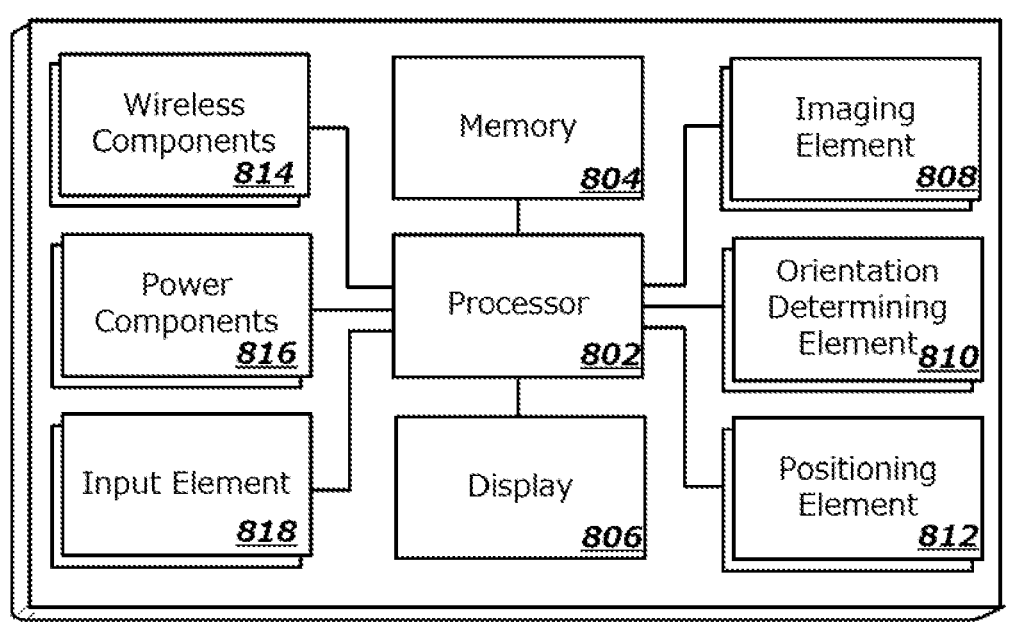
FIG. 8 illustrates example components of a client device such as that illustrated in FIG. 7.

FIG. 8 illustrates a set of basic components of an electronic computing device 800 such as the device 800 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

Figure 9:
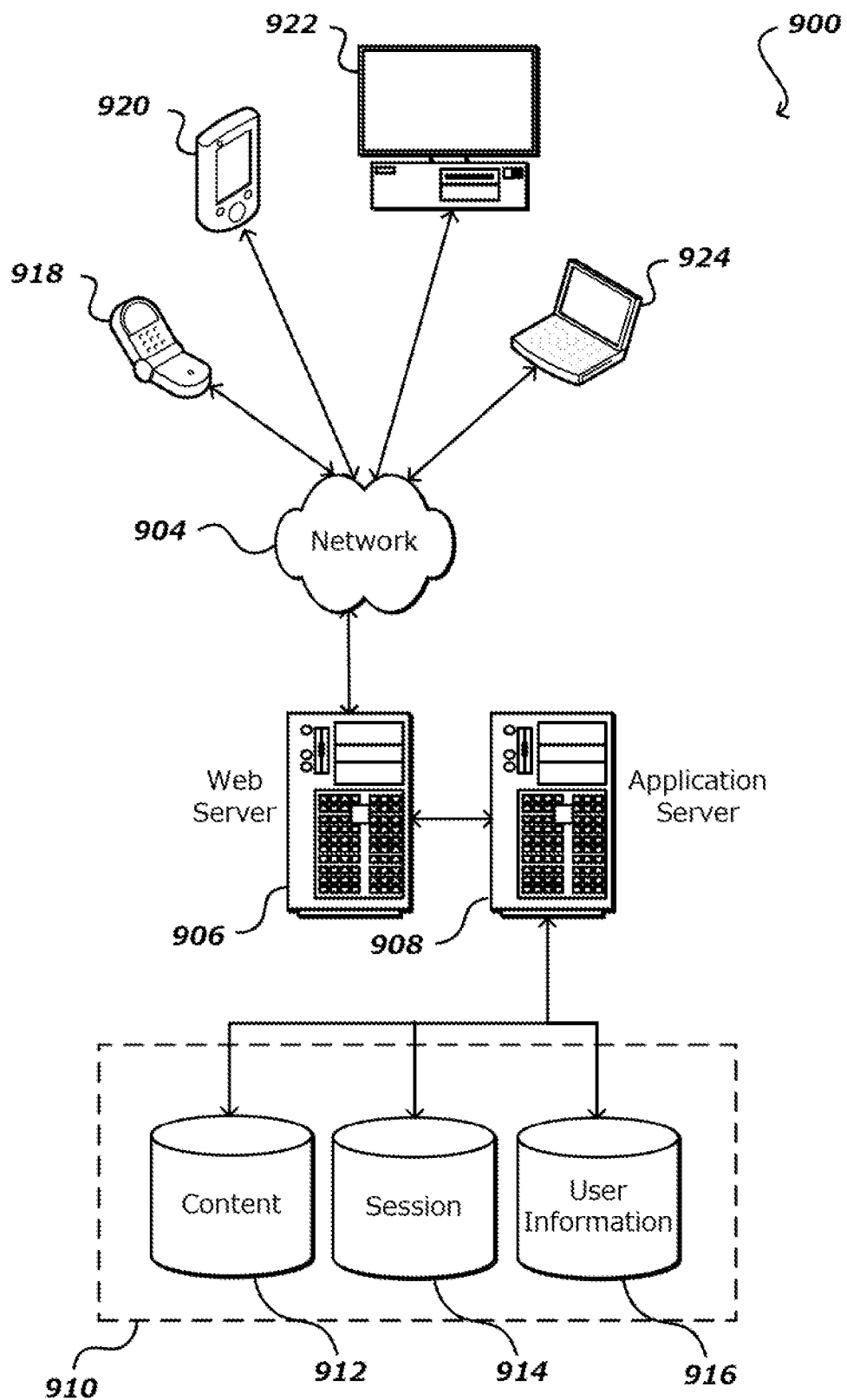
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes electronic client devices 918, 920, 922, and 924, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client devices 918, 920, 922, and 924 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 919. The data store 919 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on anyone of the user devices 918, 920, 922 and 924. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving video data including at least a portion of primary content, the primary content including a plurality of scenes;
   analyzing at least a portion of the primary content using an object recognition module to identify one or more items within the portion of the primary content;
   applying a classification to the portion of primary content, based at least in part on the identified one or more items;
   determining a usage criterion associated with the classification, the usage criterion restricting presentation of related supplemental content, with respect to the classification;
   determining the usage criterion satisfies one or more rules associated with a break period, the break period being after a duration of the portion of primary content;
   selecting supplemental content associated with the classification of the portion of primary content, the supplemental content being identified by a line item that corresponds to the classification;
   generating output video content including the primary content and the supplemental content, the supplemental content being within the break period.

2. The computer-implemented method of claim 1, wherein the video data is stored video data, further comprising:
   analyzing the video data to identify a plurality of primary content portions;

determining a plurality of break periods; and
inserting the plurality of break periods between the plurality of primary content portions.

3. The computer-implemented method of claim 1, wherein the usage criterion is a threshold period of time, further comprising:
determining a start time for the classification;
applying the threshold to the start time;
determining an end time for the classification;
determining the end time expires after a break start time for the break period.

4. The computer-implemented method of claim 1, wherein the one or more rules includes a threshold period of time between classification and the break period, a number of other classifications between the classification and the break period, a priority, or a combination thereof.

5. A computer-implemented method, comprising:
obtaining a time index classification of a least a portion of primary content, the time index classification identifying at least one time within the portion of primary content associated with a classification;
determining the classification satisfies at least one rule associated with inclusion of supplemental content with the primary content, the at least one rule corresponding to a position of the classification with respect to other segments of the primary content;
comparing the classification to a set of key words associated with the supplemental content;
selecting first supplemental content associated with at least one key word related to the classification; and
including the first supplemental content and the primary content in provided content.

6. A computer-implemented method of claim 5, wherein the at least one rule is a time threshold, further comprising:
determining a first time associated with the classification;
determining a second time associated with a break period, the break period receiving at least a portion of the supplemental content; and
determining a difference between the first time and the second time is less than the time threshold.

7. A computer-implemented method of claim 5, wherein the at least one rule is a time threshold, further comprising:
determining a first time associated with the classification;
determining a second time associated with a break period, the break period receiving at least a portion of the supplemental content;
determining a difference between the first time and the second time is greater than the time threshold;
selecting second supplemental content different than the first supplemental content; and
including the second supplemental content in the provided content.

8. The computer-implemented method of claim 5, further comprising:
determining a primary content portion, the primary content portion having a duration extending between a first break period and a second break period;
determining a plurality of scenes within the primary content portion, the scenes corresponding to primary content and each having a duration,
determining at least one respective classification for each scene of the plurality of scenes; and
determining a plurality of supplemental content corresponding to the at least one respective classifications.

9. The computer-implemented method of claim 8, further comprising:

selecting second supplemental content, of the plurality of supplemental content, having a closest time proximity to at least one respective classification.

10. The computer-implemented method of claim 5, wherein the one or more rules includes a threshold period of time between classification and the break period, a number of other classifications between the classification and the break period, a priority, or a combination thereof.

11. The computer-implemented method of claim 5, wherein the at least one rule is a quantity threshold, further comprising:
determining a first identification associated with the first classification;
determining a second identification associated with a second classification, the second identification being later in time than the first identification;
determining a break period, the break period arranged later in time than both the first identification and the second identification; and
determining a number of identifications between the first identification and the break period is less than the quantity threshold.

12. The computer-implemented method of claim 5, further comprising:
receiving video data including at least a portion of the primary content;
analyzing at least a portion of the primary content using an object recognition module to identify one or more items within the portion of the primary content;
applying the classification to the portion of primary content, based at least in part on the identified one or more items.

13. The computer-implemented method of claim 12, wherein the video data is stored video data and the time index classification is generated before comparing the classification with the supplemental content.

14. The computer-implemented method of claim 12, wherein the video data is live video data and the time index classification is generated in near-real time as the video data is received.

15. The computer-implemented method of claim 5, further comprising:
adding the classification to a set of context stream contextual targeting keywords.

16. The computer-implemented method of claim 15, further comprising:
determining a second classification fails at least one rule associated with inclusion of supplemental content with the primary content;
applying a weighting factor to the second classification;
determining the second classification satisfies the at least one rule associated with inclusion of supplemental content with primary content;
selecting second supplemental content associated with the second classification; and
including the second supplemental content in the provided content.

17. A system, comprising:
at least one processor; and
memory including instructions that, when executed by the at least one processor, cause the system to:
obtain a time index classification of a least a portion of primary content, the time index classification identifying at least one time within the portion of primary content associated with a classification;
determine the classification satisfies at least one rule associated with inclusion of supplemental content with the primary content, the at least one rule corresponding to a position of the classification with respect to other segments of the primary content;
compare the classification to a set of key words associated with the supplemental content;
select first supplemental content associated with at least one key word related to the classification; and
include the first supplemental content and the primary content in provided content.

18. The system of claim 17, wherein the instructions when executed further cause the system to:
determine a first time associated with the classification;
determine a second time associated with a break period, the break period receiving at least a portion of the supplemental content; and
determine a difference between the first time and the second time is less than a time threshold.

19. The system of claim 17, wherein the instructions when executed further cause the system to:
determine a first identification associated with the first classification;
determine a second identification associated with a second classification, the second identification being later in time than the first identification;
determine a break period, the break period arranged later in time than both the first identification and the second identification; and
determine a number of identifications between the first identification and the break period is less than the quantity threshold.

20. The system of claim 17, wherein the one or more rules includes a threshold period of time between classification and the break period, a number of other classifications between the classification and the break period, a priority, or a combination thereof.

* * * * *